US008331611B2

(12) United States Patent
Johnson, II et al.

(10) Patent No.: US 8,331,611 B2
(45) Date of Patent: Dec. 11, 2012

(54) OVERLAY INFORMATION OVER VIDEO

(75) Inventors: Larry J. Johnson, II, Sachse, TX (US);
Nicholas W. Knize, Rockwall, TX (US);
Roberto Reta, Richardson, TX (US)

(73) Assignee: Raytheon Company, Waltham, MA (US)

( * ) Notice: Subject to any disclaimer, the term of this patent is extended or adjusted under 35 U.S.C. 154(b) by 747 days.

(21) Appl. No.: 12/501,969

(22) Filed: Jul. 13, 2009

(65) Prior Publication Data
US 2011/0007962 A1    Jan. 13, 2011

(51) Int. Cl.
*G06K 9/00* (2006.01)
(52) U.S. Cl. ........................................ 382/100
(58) Field of Classification Search ............ 382/100;
713/168, 176, 178, 179; 358/3.28; 380/201
See application file for complete search history.

(56) References Cited

U.S. PATENT DOCUMENTS

| | | | |
|---|---|---|---|
| 5,799,082 A | 8/1998 | Murphy et al. | |
| 5,987,136 A * | 11/1999 | Schipper et al. | 713/176 |
| 6,724,930 B1 | 4/2004 | Kosaka et al. | |
| 7,755,635 B2 * | 7/2010 | Benman | 345/582 |
| 8,026,929 B2 * | 9/2011 | Naimark | 345/629 |
| 2005/0055574 A1 * | 3/2005 | Chmaytelli | 713/201 |
| 2005/0108261 A1 * | 5/2005 | Glassy et al. | 707/100 |
| 2006/0143233 A1 * | 6/2006 | Pietraski | 707/104.1 |
| 2007/0002040 A1 * | 1/2007 | Oldroyd | 345/419 |
| 2007/0110338 A1 * | 5/2007 | Snavely et al. | 382/305 |
| 2007/0162942 A1 * | 7/2007 | Hamynen et al. | 725/105 |
| 2007/0199076 A1 | 8/2007 | Rensin et al. | |
| 2007/0242131 A1 * | 10/2007 | Sanz-Pastor et al. | 348/14.02 |
| 2008/0024484 A1 | 1/2008 | Naimark | |
| 2008/0074423 A1 | 3/2008 | Gan et al. | |
| 2008/0215204 A1 * | 9/2008 | Roy et al. | 701/28 |
| 2008/0268876 A1 * | 10/2008 | Gelfand et al. | 455/457 |
| 2009/0002394 A1 | 1/2009 | Chen et al. | |
| 2009/0024315 A1 | 1/2009 | Scheibe | |

(Continued)

FOREIGN PATENT DOCUMENTS

EP    1 480 187    11/2004
(Continued)

OTHER PUBLICATIONS

PCT Notification of Transmittal of the International Search Report and the Written Opinion of the International Searching Authority, or the Declaration, for International Application No. PCT/US2010/041674, 11 pages, dated Oct. 29, 2010.

(Continued)

*Primary Examiner* — Wesley Tucker
*Assistant Examiner* — Shervin Nakhjavan
(74) *Attorney, Agent, or Firm* — Cantor Colburn LLP

(57) ABSTRACT

In accordance with a particular embodiment of the invention, a method for geotagging an image includes receiving an image of a real-world scene. Location information may be received corresponding to the image. The location information may identify the location of the real-world scene. The image may be synchronized with the location information corresponding to the image such that a two-dimensional point on the image corresponds to a three-dimensional location in the real world at the real-world scene. A geotag may be received. The geotag may tag the image at the image at the two-dimensional point and provide additional information concerning the real-world scene. The geotag and the three-dimensional location in the real world at the real-world scene may be stored in a geotag database.

18 Claims, 4 Drawing Sheets

U.S. PATENT DOCUMENTS

2010/0067734 A1* 3/2010 Rhoads .................. 382/100

FOREIGN PATENT DOCUMENTS

| EP | 1 748 370 | 1/2007 |
|---|---|---|
| JP | 2004 226190 | 8/2004 |
| JP | 2005 201513 | 7/2005 |
| WO | WO 2008/078790 | 7/2008 |

OTHER PUBLICATIONS

Google Earth, http://earth.google.com, 2 pages.

NASA World Wind, http://wolrdwind.arc.nasa.gov, 3 pages, Oct. 16, 2006.

U.S. Appl. No. 12/501,766, "Displaying Situational Information Based on Geospatial Data", inventor Nicholas W. Knize et al., 24 pages (including drawings), filed Jul. 13, 2009.

U.S. Appl. No. 12/501,905, "Extraction of Real World Positional Information from Video", inventor Larry J. Johnson et al., 18 pages (including drawings), filed Jul. 13, 2009.

U.S. Appl. No. 12/501,785, "Synchronizing Video Images and Three Dimensional Visualization Images", inventor Nicholas W. Knize et al., 23 pages (including drawings), filed Jul. 13, 2009.

PCT Notification of Transmittal of the International Search Report and the Written Opinion of the International Searching Authority, or the Declaration, for International Application No. PCT/US2010/041276, 15 pages, dated Sep. 27, 2010.

"Google Earth User Guide", Internet Citation Jan. 1, 2007 pp. 1-131 XP007910480 http://www.docstoc.com/docs/4625050/Googie-Earth-User-Guide.

Neumann, et al., "Augmented Virtual Environments (AVE): Dynamic Fusion of Imagery and 3D models" Proceedings IEEE 2003 Virtual Reality, Los Angeles, CA., Mar. 22-26, 2003, pp. 61-67, XP0106376212 DOI; DOI: 10.1109/VR.2003.1191122 ISBN: 978-0-7695-1882-4.

Eugster, et al. "UAV-Based Augmented Monitoring—Real-Time Georgeferencing and Integration of Video Imagery with Virtual Globes", International Archives of Photogrammetry and Remote Sensing IAPRS, vol. XXXVII Jul. 3, 2008, pp. 1229-1236, XP002600483, XXIst ISPRS Congress, Jul. 3-11, 2008 Beijing, China, International Society for Photogrammetry and Remote Sensing ISSN: 1682-1750; http://www.isprs.org/Droccedings/XXXVII/congrress /1_pdf/209.pdf.

PCT Notification of Transmittal of International Search Report and the Written Opinion of the International Searching Authority, or the Declaration, for International Application No. PCT/US/2010/041641, 16 pages, dated Oct. 1, 2010.

PCT Notification of Transmittal of International Search Report and the Written Opinion of the International Searching Authority, or the Declaration, for International Application No. PCT/US/2010/041269, 12 pages, dated Oct. 12, 2010.

Makita, et al., "Shared database of Annotation Information for Wearable Augments Reality System", Steroscopic Displays and Virtual Reality Systems, XI pp. 464-471, Jan. 19, 2004, XP040254217, ISSN: 0277-786X.

Hollerer, et al., "User Interface Management Techniques for Collaborative Mobile Augments Reality", Computers and Graphics, Elsevier, GB LNKD-DOI: 10.1016/S0097-8493(1)00122-4 vol. 25, No. 5, Oct. 1, 2001, pp. 799-810, XP004318025 ISSN: 0097-8493.

* cited by examiner

OVERLAY INFORMATION OVER VIDEO

RELATED APPLICATIONS

This application is related to U.S. patent application Ser. No. 12/828,785, filed on Jul. 1, 2010, entitled "EXTRACTION OF REAL WORLD POSITIONAL INFORMATION FROM VIDEO", to U.S. patent application Ser. No. 12/501,766, filed on Jul. 13, 2009, entitled "DISPLAYING SITUATIONAL INFORMATION BASED ON GEOSPATIAL DATA", and to U.S. patent application Ser. No. 12/501,785, filed on Jul. 13, 2009, entitled "SYNCHRONIZING VIDEO IMAGES AND THREE DIMENSIONAL VISUALIZATION IMAGES", all filed concurrently with the present application.

TECHNICAL FIELD

The present disclosure relates generally to video streams, and more particularly to overlay information over video.

BACKGROUND

Videos may provide a viewer with information. These videos may capture scenes and events occurring at a particular location at a particular time. Video capture equipment may also log data related to the scenes and events, such as the location of the video capture equipment at the time the scenes and events were captured.

SUMMARY OF EXAMPLE EMBODIMENTS

In accordance with a particular embodiment of the invention, a method for geotagging an image includes receiving an image of a real-world scene. Location information may be received corresponding to the image. The location information may identify the location of the real-world scene. The image may be synchronized with the location information corresponding to the image such that a two-dimensional point on the image corresponds to a three-dimensional location in the real world at the real-world scene. A geotag may be received. The geotag may tag the image at the image at the two-dimensional point and provide additional information concerning the real-world scene. The geotag and the three-dimensional location in the real world at the real-world scene may be stored in a geotag database.

Certain embodiments of the present invention may provide various technical advantages. A technical advantage of one embodiment may include the capability to annotate a video image of a real-world scenario with information. Additionally, teachings of certain embodiments recognize that the this information may be mapped to the geographic location of the real-world scene. Teachings of certain embodiments also recognize that this information may be stored such that any user viewing the real-world scenario could view this information. Teachings of certain embodiments also recognize that this information may be retrieved and laid over a video stream of the real-world scene such that the geographic location saved with the information and the location of the real-world scene are synchronized.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of certain embodiments of the present invention and features and advantages thereof, reference is now made to the following description taken in conjunction with the accompanying drawings, in which.

DETAILED DESCRIPTION

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Situational awareness tools may provide situational information that may aide a decision maker in making decisions. For example, in military applications, a soldier may use situational information, such as the location of a sniper, to make tactical decisions. Accordingly, the teachings of some embodiments may allow users of a situational awareness tool to share communications and observations with each other.

In some embodiments, the communications and observations (the surveillance data) about a particular location may be collected by a user, such as an agent, or a device. Examples of an agent may include a person or a vehicle. Examples of a device may include an Unmanned Aircraft Vehicle (UAV), a surveillance camera, or any device suitable for gathering information. In some embodiments, the agent may be equipped with a camera configured to collect images of the location.

The surveillance data, which may include camera images and/or video footage, may be embedded with geographic coordinates indicating the location corresponding to the surveillance data. For example, some video collectors may embed geo-positional metadata, target metadata, and other metadata into the video stream. Examples of geo-positional metadata may include, but are not limited to, latitude/longitude, altitude, azimuth, elevation, and compass information of the video collector. Examples of target information may include, but are not limited to, range of the target from the video collector, angle and orientation of the video collector, and field of view of the video collector. As a non-limiting example, metadata may be extracted from camera images and/or video footage and processed using the method of to extract and process metadata.

Figure 1:
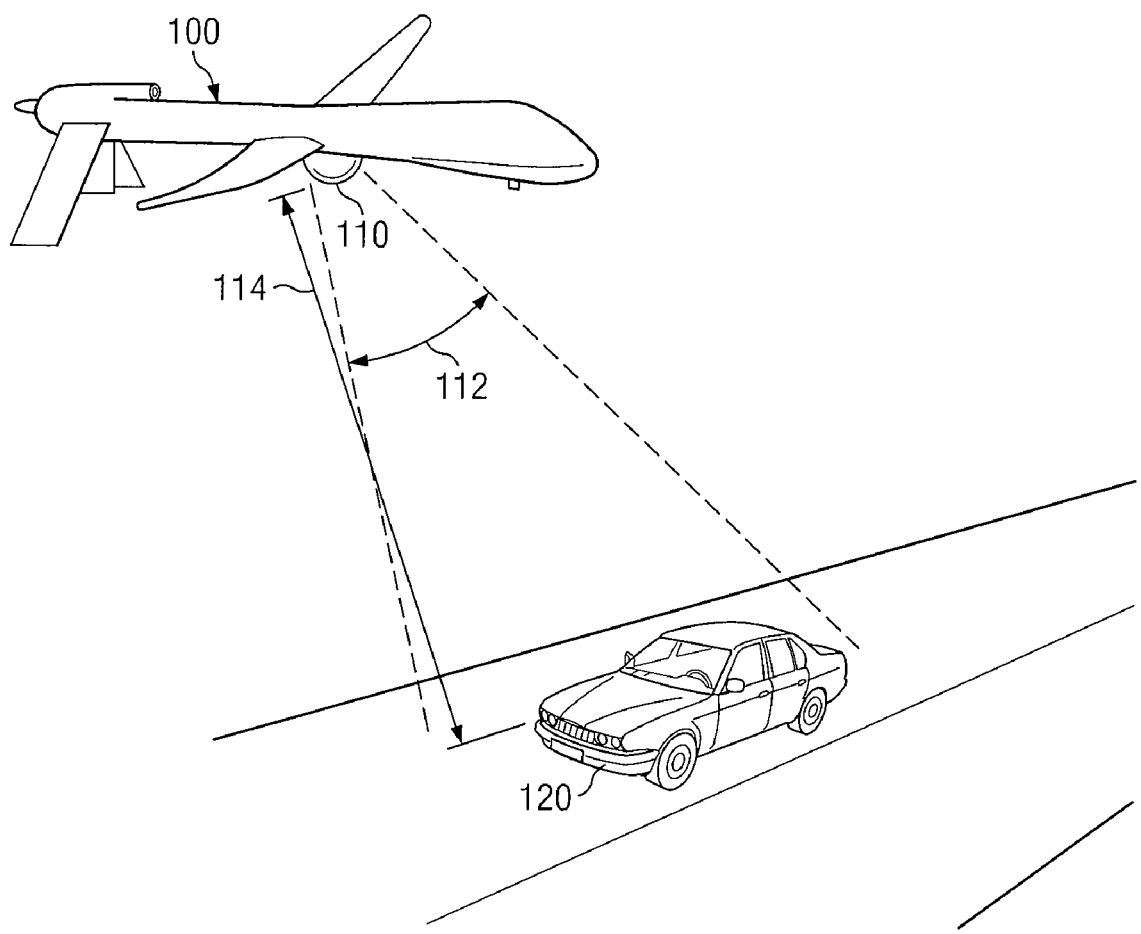
FIG. 1 shows an example unmanned aerial vehicle (UAV) with video collection capabilities.

For example, FIG. 1 shows an unmanned aerial vehicle (UAV) 100 with video collection capabilities. UAV 100 features a video collector 110. In the illustrated example, the video collector 110 is capturing a target 120. The target 120 is within the video collector's field of view 112 and at a distance 114 from the video collector. In the illustrated example, the video collector 110 may record metadata. For example, the video collector 110 may record geo-positional information of the UAV 100, such as the latitude/longitude, altitude, and azimuth information. In addition, the video collector 110 may record other metadata such as target metadata, which may include the field of view 112 and the range 114. Alternative examples may include other metadata in addition to or in place of the provided examples.

FIG. 1 illustrates a video collector 110 that records overhead aerial video. However, embodiments of the video collector 110 may record video at any orientation. For example, in one embodiment, the video collector 110 may be a handheld video collector controlled by a soldier or pedestrian. Embodiments of the methods described herein may apply to video recorded at any orientation.

Figure 2:
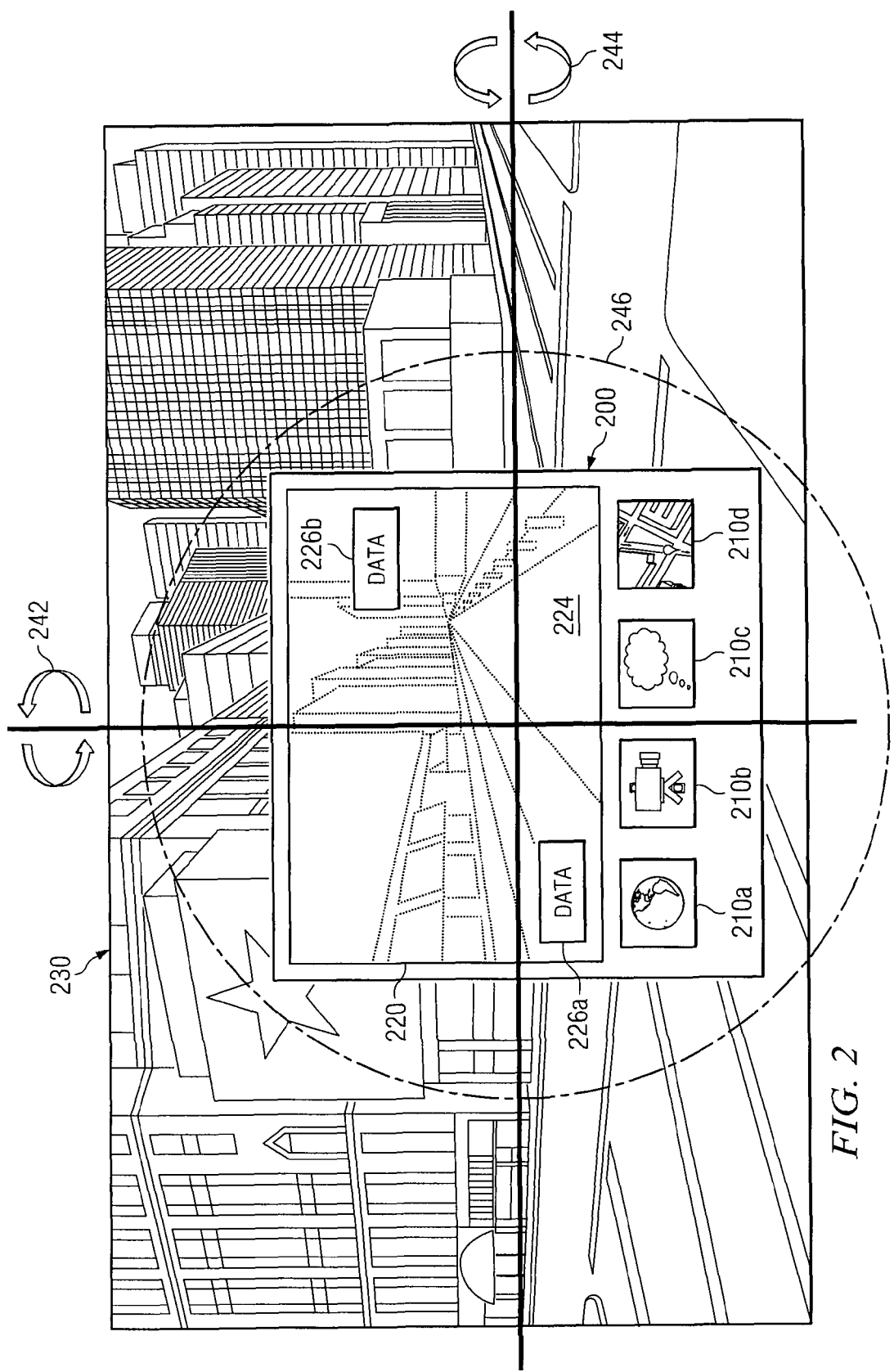
FIG. 2 illustrates an embodiment of a display that may convey situational information based on geospatial data.

FIG. 2 illustrates an embodiment of a display that may convey situational information based on geospatial data. In some embodiments the display may be generated on a device 200 which may comprise feature buttons 210 and a display screen 220. In some embodiments, the display screen 220 may comprise a background image 224 and/or one or more geotags 226. In some embodiments, the location represented by the background image 224 may correspond to the location of a live scene 230 in which the device 200 is located.

The device 200 may be any suitable device for displaying an image. In some embodiments, the device 200 may be portable; in other embodiments, the device 200 may not be portable. Examples of a portable device 200 may include, but are not limited to, a mobile phone, goggles, or a laptop computer.

The device 200 may include a display screen 220. In some embodiments, the display screen 220 may be any component suitable to display an image such as a Cathode Ray Tube (CRT), a Liquid Crystal Display (LCD), a Plasma Display Panel (PDP), or a projector. In some embodiments, the display screen 220 may be a touch screen that may allow a user to control the image or the device 200. For example, the user may control the image by touching the display screen 220 to make changes such as zooming in or out, moving the image up, down, left, or right, rotating the image, or adjusting the viewing angle. As another example, the feature buttons 210 may be integrated on the display screen 220 to allow the user to control the device 200 by touching the display screen 220. In some embodiments, the display screen 220 may be configured to change the image displayed according to changes in the position and/or viewing angle of the device 200.

The feature buttons 210 may be configured to enable access and/or control to a variety of features of the device 200. The feature buttons 210 may be any suitable user interface for the device 200, such as a keyboard or keypad, a mouse, or a touch screen. In some embodiments, the feature buttons 210 may be located remotely from the device 200. The feature buttons 210 may provide access to and/or a control interface for one or more features such as, but not limited to, mapping features, tracking features, communications features, video features, global visualization features, and/or any other suitable feature. Internet features may include internet browsing as well as downloading and uploading of data. Mapping features may be configured to provide maps and travel directions to a user. Tracking features may include tracking one or more moving subjects or objects. For example, in military applications, members of allied troops may be tracked in one color and members of enemy troops may be tracked in a different color. Communications features may provide voice call, text messaging, chat session, and notification capabilities. Video features may include recording, playing, pausing, fast forwarding, and rewinding of video. Global visualization features may allow a user to select a location of the globe to be represented in a three-dimensional view. In some embodiments, an application may use capabilities of multiple feature buttons 210 at the same time. For example, a situational awareness application may use the internet feature, the communications feature, the global visualization feature, and/or any other suitable feature simultaneously. As another example, the situational awareness application may use the tracking feature, the mapping feature, and/or any other suitable feature simultaneously.

In some embodiments, the image displayed on the display screen 220 of the device 200 may comprise the background image 224. In the illustrated embodiment, the location represented by the background image 224 corresponds to the location of the live scene 230 in which the device 200 is located. In some embodiments, for example, the device 200 may include a video collector such as a video camera, and the background image 224 may represent footage of the live scene 230 captured by the video collector. In other embodiments, the background image 224 may represent footage captured away from the location of the device 200. For example, the background image 224 may represent footage captured by a remote video capture device, such as the UAV 100 of FIG. 1. In some embodiments, this video footage may be streamed to the device 200 at real time or near real time; in other embodiments, the background image 224 may represent prerecorded footage. In yet further embodiments, the background image 224 may represent a still frame image, such as a frame from a video stream. For example, in some embodiments, the device 200 may retain the capability to "pause" video footage streaming to the device 200.

In some embodiments, the background image 224 may be a three-dimensional visualization image. In some embodiments, the three-dimensional visualization tool may be a commercial off the shelf (COTS) tool like Google Earth or NASA World Wind. In some embodiments, the background image may be selected according to the geospatial perspective of the device. That is, the background image may be selected according to the position and viewing angle of the device. For example, a user located in a battlefield may be interested in knowing if any Improvised Explosive Devices (IEDs) have exploded in the area in the last month. The user may point the device toward a region of the battlefield to view the location of recent IED explosions within that region. Additionally, the user may move or rotate the device to change the perspective displayed. Thus, the user may be able to obtain information about other regions within the battlefield.

In some embodiments, the position of the device 200 may be determined using a Location Based Services (LBS) system. An LBS system may be any system suitable for locating the latitude, longitude, and/or elevation coordinates of the device 200. For example, an LBS system may use a satellite system such as a Global Positioning System (GPS) to locate the device 200. As another example, an LBS system may use multilateration techniques based on the signals sent and/or received by the device 200 such as Time Difference Of Arrival (TDOA) techniques or Enhanced Observed Time Difference (E-OTD) techniques.

In some embodiments, the viewing angle of the device 200 may be determined using any suitable systems such as, but not limited to, accelerometers, gyroscopes, and/or compasses onboard the device 200. The viewing angle may comprise azimuth data, compass direction data, and/or orientation data. Azimuth data may describe the rotation of the device 200 around a horizontal axis 242, the horizontal axis 242 running substantially parallel to the surface of the earth. For example, azimuth data may indicate whether the device 200 is pointed down toward the ground or up toward the sky. Compass direction data may describe the rotation of the device 200 around a vertical axis 244, the vertical axis 244 running substantially perpendicular to the surface of the earth. In some embodiments, the compass direction data may range from 0 to 360 degrees. For example, the compass direction may be 0 degrees when the device 200 faces East, 90 degrees when the device 200 faces North, 180 degrees when the device 200 faces West, and 270 degrees when the device 200 faces South. Orientation data may indicate whether the device 200 is turned on its side, for example, according to a device orientation angle 246. The device orientation angle 246 may represent the rotation around an axis in a third dimension, the axis in the third dimension running perpendicular to both the horizontal axis 242 and the vertical axis 244. By way of non-limiting illustration, Google's G1 mobile phone running on the Android platform and Apple's iPhone contain tools to recognize location and viewing angle of the respective mobile device.

In some embodiments, the device 200 may be configured to display the background image 224 corresponding to geospatial coordinates selected by a user of the device 200. That is, a user may override the function that selects the background image 224 corresponding to the perspective of the device 200. Overriding the device perspective may allow the user to obtain information about a position or viewing angle for which the user would like to obtain situational information. In some embodiments, the position and viewing angle of the device may be used to generate a default background image that may be the starting image when the user enables the override function. Thus, a user may continue to view information about a surrounding scene without having to continuously hold the device in the same position.

In some embodiments, the background image 224 may be displayed to provide context for situational information. In some embodiments, the characteristics of the situational information being conveyed may be used to determine the type of background image 224 to be displayed, if any. For example, a background image 224 may not be required to convey the name of a shopkeeper. As another example, a two-dimensional image, such as a map or a blueprint, may be well-suited to conveying the address where a shop is located or the floor plan of the shop. As yet another example, a three-dimensional visualization image may be well-suited to conveying the shooting angle of a sniper located at a particular entrance of the shop. In some embodiments, the three-dimensional visualization image may be provided by a three-dimensional visualization tool. In some embodiments, the three-dimensional visualization tool may be a Commercial Off-The-Shelf (COTS) tool like Google Earth or NASA World Wind.

In some embodiments, the display screen 220 of the device 200 may display one or more geotags 226 to provide situational information about the displayed image. The geotags 226 may be in any format suitable to convey the situational information. For example, the geotags 226 may be in visual form, such as text, icons, photographs, color codes, and/or drawings, audio form, such as voice recordings or sound effects, or a combination, such as video. In some embodiments, the geotags 226 may comprise geographic coordinates that indicate a location corresponding to the geotag. In some embodiments, the geographic coordinates may indicate the latitude, longitude, and/or elevation described by the situational information. For example, if the situational information indicates that an IED exploded, the geographic coordinates may indicate where the IED exploded. The geotags 226 may be overlaid on the background image 224. For example, the geotags may be overlaid according to their geographic coordinates. Geotags may be generated using any suitable method, device, or technique that places coordinates on a piece of information. The coordinates may be two-dimensional, three-dimensional, or four-dimensional (including time).

In some embodiments, the geotags 226 may comprise social network geotags, historical geotags, identification geotags, annotation geotags, or a combination. For example, social network geotags may indicate social opinion information like where to find the best coffee in town, social relationship information like a shop owner's brother is a military detainee, social observation information like a sniper has been observed in a particular location, or any other information available through a social network.

Historical geotags may provide historical information such as the number of Improvised Explosive Devices (IEDs) that detonated in the area in the last month.

Identification geotags may provide identification information. For example, an identification geotag may identify an orphanage one hundred yards away. As another example, an identification geotag may translate Grid Reference Graphics (GRG) information. GRG information may provide a naming convention for describing a location. The GRG information may comprise a name that denotes a particular building, a color that denotes a floor number of the building, and a number that denotes an entrance of the building. For example, a soldier may receive GRG information "Matilda, green, 2" indicating the location of a sniper. However, understanding this GRG information may require knowledge of the naming convention. In some embodiments, the geotags 226 may provide the information of the GRG reference without requiring the user to know the GRG naming convention. Thus, the soldier may be able to visualize where the sniper is located and/or the sniper's shooting angle when deciding how to safely approach the building.

Annotation geotags may comprise notes that a user makes about a scene. For example, a user may annotate the background image 224 using a grease pen function that allows the user to draw or write on the display screen 220 by hand or a computerized annotation function that allows a user to select descriptive icons, labels, or color codes to be incorporated into the underlying scene at the option of the user. A grease pen may include any device operable to allow a user to draw a freehand sketch over a motion picture image or stream of images.

In some embodiments, the geotags 226 may be given a rating. For example, determining where to find the best coffee in town may be based on the highest percentage of favorable ratings according to a large number of users. As another example, ratings may be affected by the date and time the geotag 226 was generated. For example, more current geotags may be given a more favorable rating than older geotags. In some embodiments, a rating system may help to ensure a user is provided access to more informative geotags. For example, if a first geotag is a photograph with a clear view and a second geotag is a blurry photograph of the same view, the first geotag may be given a more favorable rating.

In some embodiments, the geotags 226 may be continually updated by one or more agents or devices, thereby creating a continuous journal of information about an area. The journal may be based on contributions from any agent or device that has previously surveyed the area. For example, a border patrol agent may collect and share an image of a hole in a fence in a geotag 226. Later, a second border patrol agent may observe a change in the size of the hole. The second border patrol agent may collect and share an updated image of the hole to the geotag 226. Thus, a user retrieving information about the fence may have access to the cumulative knowledge of both agents. Over time, a large amount of situational information may accumulate, thereby providing users with detailed information about areas of interest. In some embodiments, access to cumulative knowledge may allow the user to have increased situational awareness.

Figure 3:
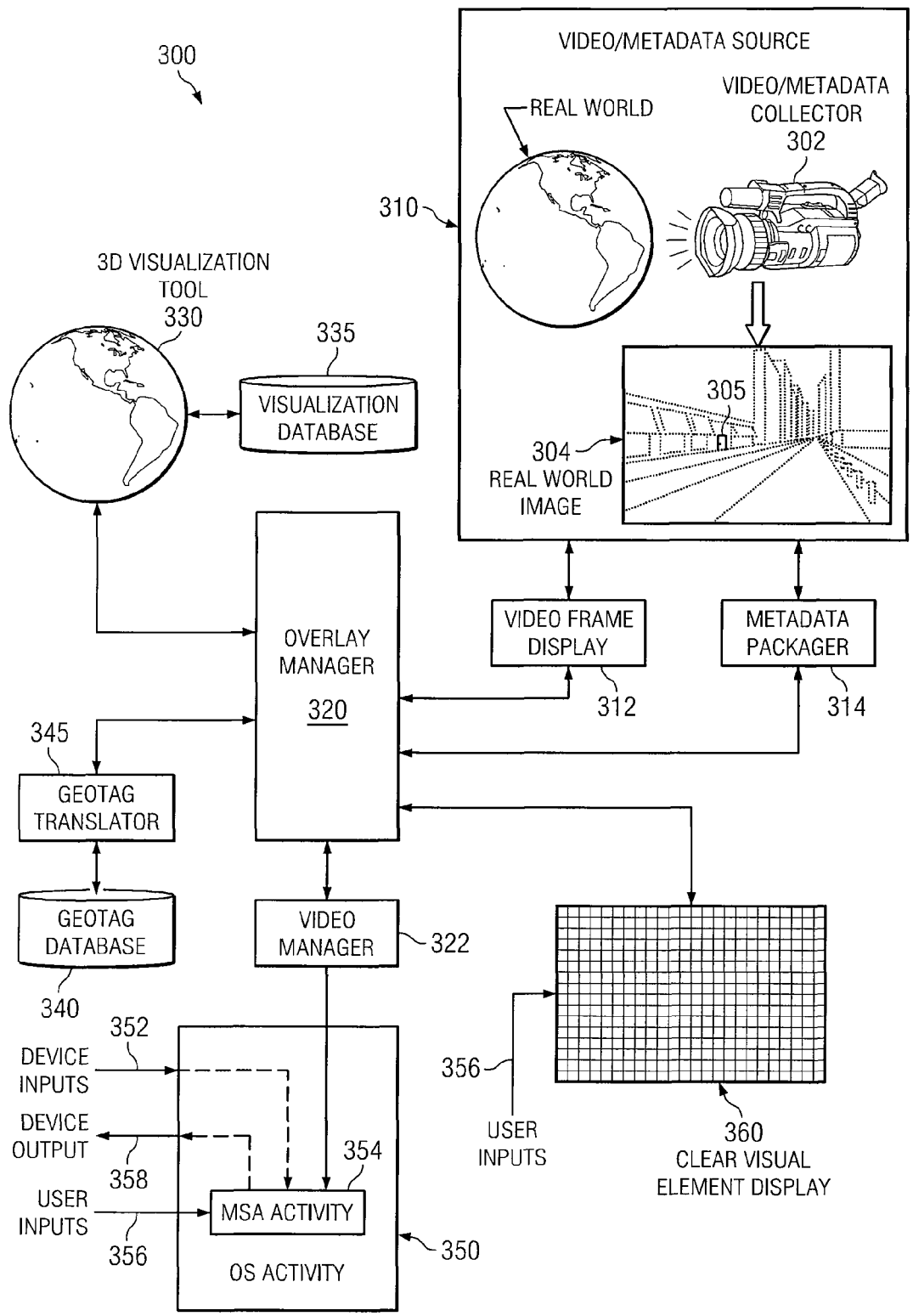
FIG. 3 shows a block diagram illustrating a system for receiving and storing geotags, according to one embodiment.

FIG. 3 shows a block diagram illustrating a system 300 for receiving and storing geotags, according to one embodiment. In some embodiments, the system 300 may feature a video/metadata source 310, an overlay manager 320, a visualization tool 330, a geotag database 340, and an Operating System (OS) Activity 350. Additionally, in some embodiments, the system 300 may receive inputs such as device inputs 352 and/or user inputs 356 to generate a device output 358. In some embodiments, the OS Activity 350 may comprise a Mobile Situational Awareness (MSA) 354. In some embodiments, the three-dimensional visualization tool 330 may be coupled to a visualization database 335. In some embodiments, the overlay manager 320 may be coupled to the geotag database 340 through a geotag translator 345. In some embodiments, the geotag translator 345 may format geotags into a file format that may be used by overlay manager 320. For example, the geotag translator 345 may format the geotags in keyhole markup language (KML) format or key-length-value (KLV) format.

In the illustrated embodiment, a video frame display 312 and a metadata packager 314 receive video and metadata from the video/metadata source 310. In the illustrated example, the video/metadata source 310 includes a video collector 302 that collects images/video of a real world scene. For example, the illustrated embodiment shows a real world image 304 taken from a frame of a real-time streaming video of the real world scene. In other examples, the video stream may be a previously recorded video. In some embodiments, the video stream may be provided in near-real time, in which streaming of the video feed may lag real-time by a latency period. In a few example embodiments, this latency period may last approximately a few seconds.

In one example embodiment, the video frame display 312 and the metadata packager 314 may receive video and metadata from a metadata-encoded video. For example, some video collectors may embed geo-positional metadata, target metadata, and other metadata into the video stream. Examples of geo-positional metadata may include, but are not limited to, latitude/longitude, altitude, azimuth, elevation, and compass information of the video collector. Examples of target information may include, but are not limited to, range of the target from the video collector, angle and orientation of the video collector, and field of view of the video collector. As a non-limiting example, the metadata may be extracted from camera images and/or video footage and processed using the method of, or any other suitable method; these metadata and video frames may then submitted to overlay manager 320.

Additionally, the metadata and the camera images and/or video footage may be synchronized using the method of, or any other suitable method. For example, the real world image 304 illustrated in FIG. 3 is a two-dimensional display of a three-dimensional street scene. In one example embodiment, this two-dimensional display may be synchronized with the three-dimensional street scene by mapping one or more pixels in the two-dimensional display to a three-dimensional, real-world location. For example, the illustrated real world image 304 features a door 305. In the real world, that door 305 may be identified according to three-dimensional coordinates, such as latitude, longitude, and altitude. This three-dimensional coordinate data may be identified using the metadata extracted from the camera images and/or video footage. Once the three-dimensional location of the door 305 is known, this three-dimensional location data may be mapped to one or more pixels that represent the door 305 in the real world image 304. In one example, a pixel illustrating the door 305 may be located at a point (x, y) in the real world image 304. This pixel may be mapped to the real location of the door 305 such that the point (x, y) represents the three-dimensional location of the door 305 in the real world. Thus, in one example, an x-y coordinate on the real-world image 304 may also represent a latitude-longitude-altitude coordinate in the real world.

Note that, in some embodiments, not every pixel may be mapped to a real-world coordinate. For example, teachings of certain embodiments recognize that less-precise mapping may reduce processor requirements and increase response time. In addition, mapping between real-world coordinates and the real world image 304 may not rely on the pixel-mapping mechanism describe above, but may instead use any other suitable methods.

In some embodiments, the OS Activity 350 may be an interface between the hardware and the software of a device such as the device 200 of FIG. 2. For example, OS Activity 350 may comprise base classes that interact with the hardware architecture of the device. Additionally, the OS activity 350 may receive device inputs 352 and/or the user inputs 356 and send this data to the overlay manager 320.

In some embodiments, the OS Activity 350 may manage a situational awareness application. For example, the OS Activity 350 may receive the device inputs 352 and direct them to the situational awareness application. In some embodiments, the device inputs 352 may comprise geospatial data defining a geographic region in which the device is located. For example, the geospatial data may comprise position data, such as latitude data, longitude data, and elevation data, and/or viewing angle data, such as azimuth data, compass direction data, and orientation data. In some embodiments, the device inputs 352 may comprise situational information to be pushed from the device to a the situational awareness tool. For example, the device inputs 352 may comprise a new geotag, such as a photograph, to be pushed to the geotag database 340.

In some embodiments, the MSA Activity 354 of the OS Activity 350 may extend the base capabilities of the OS Activity 350. In some embodiments, the MSA Activity 354 may receive user inputs 356 from a user interface. For example, the user inputs 356 may comprise user search criteria and/or user viewing criteria. In some embodiments, user search criteria may indicate the characteristics of the geotags that the user is interested in retrieving. For example, the user search criteria may indicate that the user has requested to see the names of store clerks on the block. As another example, the user search criteria may indicate that the user has requested to see the location of a hole in a fence. The user search criteria may be used to request any suitable characteristics. In some embodiments, user viewing criteria may indicate the view that the user is interested in seeing. For example, the user may request to modify the viewing angle of the current view. As another example, the user may request to view the geographic region corresponding to a particular set of geographic coordinates.

The overlay manager 320 generates overlay graphics and positional information from the video source, metadata, 3D visualization tool 330, and/or geotags from the geotag database 340. In some embodiments, the device output 218 may be used to convey the information produced by the overlay manager 320 to a user. For example, the device output 358 may be used to display the information at a display, such as the display 220 of FIG. 2. In some embodiments, the device output 358 may be input into another system. For example, the device output 358 may be output to a computer where the data may be further processed or displayed.

In the illustrated embodiment, the overlay graphics are represented by a clear visual element (CVE) display 360. In some embodiments, the CVE display 360 may be positioned over, and synchronized with, a video frame such that, when the overlay graphics are "laid over" the video frame, they share coordinate systems. For example, as explained above, each pixel in the real world image 304 may be identified in a two-dimensional coordinate system. The overlay graphics may be configured, such that, points in the CVE display 360 may be identified in the same two-dimensional coordinate system. In this manner, the CVE display 360 may be mapped to the real world image 304. Furthermore, because the real world image 304 may be mapped to three-dimensional, real-world location data, the CVE display 360 may also be mapped to the same three-dimensional, real-world location data.

In some embodiments, the CVE display 360 may receive user inputs 356. For example, a user may wish to annotate the door 305 using a geotag, such as the geotags 226 described in FIG. 2. The user may select a point on the CVE display 360; this point may then be mapped to a point on the real-world image 304 and to a three-dimensional location in the real world, as explained above. Thus, the geotag added by the user may be associated with the real-world, three-dimensional location of the door 305 and then stored in the geotag database 340.

Users may add geotags using any suitable method. For example, in some embodiments, a user may select a point on the CVE display 360. For example, a user may annotate the real-world image 304 using a grease pen function that allows the user to draw or write on the CVE display 360 by hand. In some embodiments, a user may add a geotag using buttons such as the feature buttons 210 of FIG. 2, as well as any other suitable user interface for the device 200, such as a keyboard or keypad, a mouse, or a touch screen.

In some embodiments, a computerized annotation function that allows a user to select descriptive icons, labels, or color codes to be incorporated into the underlying scene at the option of the user. Furthermore, in some embodiments, a user may include additional material in a geotag, such as text, photographs, drawings, audio form, voice recordings, sound affects, or video. In some embodiments, the user may also timestamp the geotag or include commentary on the validity of the geotag, such as rating information or the source of information.

In some embodiments, the geotag database 340 may be local, for example, it may be located on the device configured with the overlay manager 320. Alternatively, the geotag database 340 may be remote, for example, it may be located at a network server.

In some embodiments, the mobile situational awareness tool may receive a request to pull a geotag from the geotag database 340. The request may comprise geospatial data that defines a geographic region in which the device is located. The geospatial data may be based on the device inputs 352 and/or the user inputs 356. In some embodiments, the geotag database 340 may send a geotag in response to the request if the geographical coordinates of the geotag are within the geographic region of the request. In some embodiments, the request may comprise user search criteria indicating one or more characteristics of the geotag requested from the database. The geotag database 340 may send a geotag if the characteristics of the geotag match the characteristics requested in the request.

For example, the real world image 304 may represent one frame of a streaming video captured by the video/metadata collector 302. This video/metadata collector may be moving, capturing a variety of images in a variety of locations. The user may wish for geotags to appear whenever the video/metadata collector 302 captures an image of a location that was tagged with a geotag. In one illustrative example, the video/metadata collector 302 may be in a stationary point, rotating in a circle, and collecting streaming video. Thus, the video/metadata collector 302 is going to film the door 305 once per revolution. In this example, the geotag added by the user may appear anytime the door 305 appears. In some embodiments, the CVE display 360 may display the geotag of the door 305 over the image of the door 305.

Embodiments are not limited to displaying geotags or other data over a real world image or video. For example, the illustrated system 300 also features a three-dimensional visualization tool 330 in communication with a visualization database 335. In some embodiments, the three-dimensional visualization tool 330 may be used to generate a background image, such as the background image 224 of FIG. 1. The background image may be selected according to geospatial data such as latitude, longitude, elevation azimuth, compass direction, and/or orientation. In some embodiments, the geospatial data may be based on the device inputs 352, the user viewing criteria of the user inputs 356, or a combination. For example, a background image selected according to the device inputs 352 may be refined according to the user viewing criteria of the user inputs 356. In some embodiments, the user viewing criteria may allow the user to modify the perspective of the view by accessing features of a COTS three-dimensional visualization tool such as Google Earth or NASA World Wind. For example, the user may be able to zoom in or zoom out of the area surrounding the location shown in the video, shift the image up, down, left, or right, change the compass direction, or change the viewing angle. Refining the background area according to the user viewing criteria may provide the user with more information which may allow for greater situational awareness.

According to some embodiments, the user viewing criteria may also comprise any criteria that may be entered into the three-dimensional visualization tool 330. That is, the user viewing criteria may be used to access any feature of the three-dimensional visualization tool 330 such as a COTS three-dimensional viewing tool. For example, the user viewing criteria may request that information be displayed such as geographic borders, names of geographic locations, names of landmarks, or street locations and names. The user viewing criteria may also modify the displayed image to provide more information about the view. For example, buildings may be displayed in a three-dimensional form, photographs of street views may be accessed, or terrain information may be shown. The user viewing criteria may also be used to view current conditions in the area such as traffic and/or weather conditions.

In the illustrated embodiment, the three-dimensional visualization tool 330 is coupled to a visualization database 335. The visualization database 335 may be local, for example, it may be located on the device configured with the three-dimensional visualization tool 330. Alternatively, the visualization database 335 may be remote, for example, it may be located at a network server. According to some embodiments, the visualization database 335 may be a COTS database. The visualization database 335 may hold three-dimensional visualization images depicting a plurality of locations. In some embodiments, the images may comprise satellite images, aerial photography images, Geographic Information System (GIS) images, or a combination. The three-dimensional visualization tool 330 may query the visualization database 335 to obtain images of a particular location.

In some embodiments, the overlay manager 320 may incorporate both the three-dimensional visualization tool 330 and real-world video or images from the video/metadata source 310 into a single output by overlying data from the three-dimensional visualization tool on the real-world image 304. For example, just as geotags may be displayed by the CVE display 360, so may data from the three-dimensional visualization tool. For example, the three-dimensional visualization tool may include map data such as street names and addresses; this data may be produced on the CVE display 360 and overlaid on top of the real world image 304. As a non-limiting example, geotags, 3D visualization data, and/or video footage may be displayed using the method of, or any other suitable method.

In another example, a second user may view the same real-world scene through a second device. The second device may import the geotag and overlay the geotag on top of the real-world scene viewed through the second device. In this manner, the geotag may be stored such that it is not attached to any particular video, but is instead stored according to location and may be overlaid on any image or video of the real-world scene.

Figure 4:
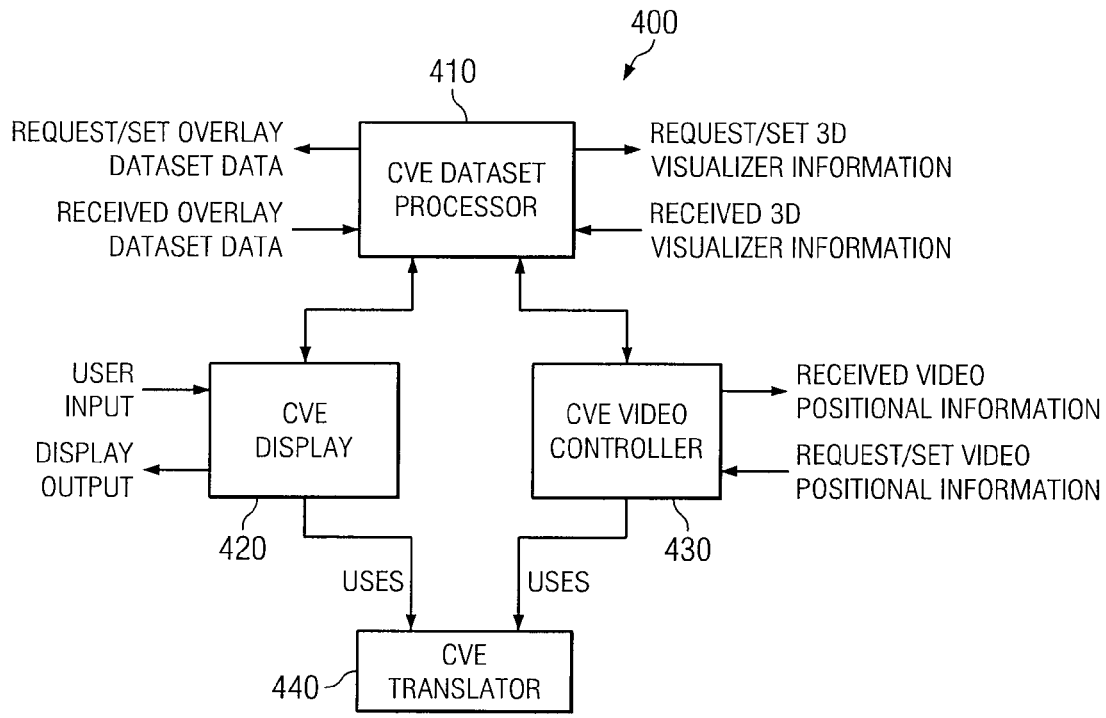
FIG. 4 shows a block diagram of a clear visual element system according to one embodiment.

FIG. 4 shows a block diagram of a CVE system 400 according to one embodiment. The system 400 features a CVE dataset processor 410, a CVE display 420, a CVE video controller 430, and a CVE translator 440. One example of the CVE display 420 may include the CVE display 360 of FIG. 3. Additionally, one or more of the components of system 400 may be incorporated into the system 300 of FIG. 3.

In the illustrated embodiment, the CVE video controller 430 may request and receive positional information of an image in a video stream. As one example, the video controller 430 may request the real-world, three-dimensional location of the real-world image 304 of FIG. 3. In some embodiments, receiving this real-world positional information may include analyzing metadata from a video/metadata collector, such as the video/metadata collector 302 of FIG. 3.

The CVE dataset processor 410 may then request and receive three-dimensional visualization information corresponding to the location of the real-world image. The CVE dataset processor 410 may also request overlay data corresponding to the location of the real-world image. One example of overlay data may include the geotags described in FIGS. 2 and 3.

The CVE translator 440 may map the real-world, three-dimensional coordinates into two-dimensional screen pixels. The CVE display 420 may then overlay the video with overlay data, such as geotags, as well as three-dimensional visualization data, which are mapped to the pixels of the CVE display 420 by the CVE translator 440.

Additionally, the CVE display 420 may receive user input. For example, user input may include a request to add, modify, or delete geotags. The CVE translator 440 may translate the user input pixel locations into three-dimensional, real-world locations. The CVE dataset processor 410 may then add the geotag data and the three-dimensional location of the geotag to a geotag database, such as the geotag database 340 of FIG. 3.

Figure 5:
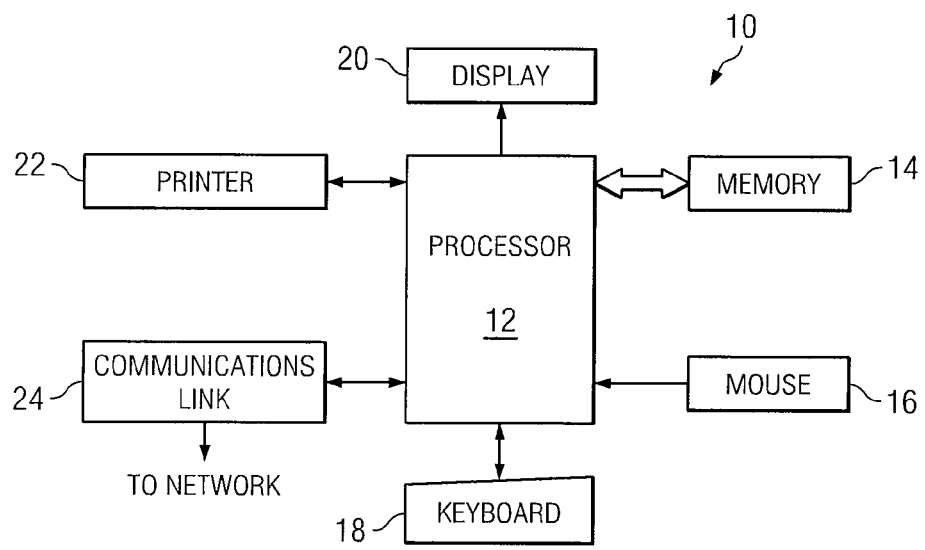
FIG. 5 presents an embodiment of a general purpose computer operable to perform one or more operations of various embodiments of the invention.

FIG. 5 presents an embodiment of a general purpose computer 10 operable to perform one or more operations of various embodiments of the invention. The general purpose computer 10 may generally be adapted to execute any of the well-known OS2, UNIX, Mac-OS, Linux, and Windows Operating Systems or other operating systems. The general purpose computer 10 in this embodiment comprises a processor 12, a memory 14, a mouse 16, a keyboard 18, and input/output devices such as a display 20, a printer 22, and a communications link 24. In other embodiments, the general purpose computer 10 may include more, less, or other component parts.

Several embodiments may include logic contained within a medium. Logic may include hardware, software, and/or other logic. Logic may be encoded in one or more tangible media and may perform operations when executed by a computer. Certain logic, such as the processor 12, may manage the operation of the general purpose computer 10. Examples of the processor 12 include one or more microprocessors, one or more applications, and/or other logic. Certain logic may include a computer program, software, computer executable instructions, and/or instructions capable being executed by the general purpose computer 10. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as the memory 14. The memory 14 may comprise one or more tangible, computer-readable, and/or computer-executable storage medium. Examples of the memory 14 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

The communications link 24 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

Although the illustrated embodiment provides one embodiment of a computer that may be used with other embodiments of the invention, such other embodiments may additionally utilize computers other than general purpose computers as well as general purpose computers without conventional operating systems. Additionally, embodiments of the invention may also employ multiple general purpose computers 10 or other computers networked together in a computer network. For example, multiple general purpose computers 10 or other computers may be networked through the Internet and/or in a client server network. Embodiments of the invention may also be used with a combination of separate computer networks each linked together by a private or a public network.

Although several embodiments have been illustrated and described in detail, it will be recognized that substitutions and alterations are possible without departing from the spirit and scope of the present invention, as defined by the appended claims. Modifications, additions, or omissions may be made to the systems and apparatuses described herein without departing from the scope of the invention. The components of the systems and apparatuses may be integrated or separated.

Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A method for geotagging an image, comprising:
   receiving an image of a real-world scene;
   receiving location information corresponding to the image, the location information identifying a location of the real-world scene;
   synchronizing the image with the location information corresponding to the image such that a two-dimensional point on the image corresponds to a three-dimensional location in the real world at the real-world scene;
   receiving a geotag, the geotag tagging the image at the two-dimensional point, the geotag providing additional information concerning the real-world scene, wherein the receiving a geotag comprises:
     providing a clear visual element to a user, the clear visual element operable to overlay the image and receive instructions from the user to place a geotag at a point on the clear visual element; and
     synchronizing the clear visual element with the image such that the point on the clear visual element corresponds to the two-dimensional point on the image; and
   storing the geotag and the three-dimensional location in the real world at the real-world scene in a geotag database.

2. The method of claim 1, the synchronizing the image with the location information corresponding to the image such that a two-dimensional point on the image corresponds to a three-dimensional location in the real world at the real-world scene comprises synchronizing one or more pixels of the image with the three-dimensional location in the real world.

3. The method of claim 1, wherein the image is a video frame from a real-time or near-real time video stream.

4. The method of claim 1, wherein the image is generated by a three-dimensional visualization tool.

5. The method of claim 1, the synchronizing the clear visual element with the image comprises synchronizing one or more pixels of the clear visual element with one or more pixels of the image.

6. The method of claim 1, wherein the clear visual element is operable to receive instructions from the user via a grease pen.

7. The method of claim 1, the additional information including one or more of the group consisting of: text, icons, labels, photographs, color codes, drawings, audio, voice recordings, sound effects, video, and ratings.

8. The method of claim 1, further comprising:
   receiving updates to the geotag by a second user, and
   updating the geotag database.

9. The method of claim 1, wherein the geotag database is operable to receive and transmit geotags to multiple users.

10. A system for geotagging an image, comprising:
    a collector operable to receive an image of a real-world scene and to receive location information corresponding to the image, the location information identifying a location of the real-world scene;
    a image synchronizer operable to synchronize the image with the location information corresponding to the image such that a two-dimensional point on the image corresponds to a three-dimensional location in the real world at the real-world scene; and
    a geotag receptor operable to:
      receive a geotag, the geotag tagging the image at the two-dimensional point, the geotag providing additional information concerning the real-world scene; and
      store the geotag and the three-dimensional location in the real world at the real-world scene in a geotag database;
    a clear visual element, the clear visual element operable to overlay the image and receive instructions from a user to place a geotag at a point on the clear visual element; and
    a clear visual element synchronizer, the clear visual element synchronizer operable to synchronize the clear visual element with the image such that the point on the clear visual element corresponds to the two-dimensional point on the image.

11. The system of claim 10, the image synchronizer further operable to synchronize one or more pixels of the image with the three-dimensional location in the real world.

12. The system of claim 10, wherein the image is a video frame from a real-time or near-real time video stream.

13. The system of claim 10, wherein the image is generated by a three-dimensional visualization tool.

14. The system of claim 10, the clear visual element synchronizer further operable to synchronize one or more pixels of the clear visual element with one or more pixels of the image.

15. The system of claim 10, wherein the clear visual element is further operable to receive instructions from the user via a grease pen.

16. The system of claim 10, the additional information including one or more of the group consisting of: text, icons, labels, photographs, color codes, drawings, audio, voice recordings, sound effects, video, and ratings.

17. The system of claim 10, the geotag receptor further operable to:
    receive updates to the geotag by a second user, and
    update the geotag database.

18. The system of claim 10, the geotag receptor further operable to receive and transmit geotags to multiple users.

* * * * *